United States Patent
Sisson et al.

(10) Patent No.: US 11,829,589 B2
(45) Date of Patent: Nov. 28, 2023

(54) ELECTRONIC CHECKLIST COMMAND SEQUENCER

(71) Applicant: Rockwell Collins, Inc., Cedar Rapids, IA (US)

(72) Inventors: James E. Sisson, Palo, IA (US); Sarah Barber, Cedar Rapids, IA (US); Justin T. Zellmer, Temecula, CA (US); Ernest A. Snider, Minnesott Beach, NC (US); Christel P. Gray, Richmond, TX (US); Bryon S. Kanne, Vadnais Heights, MN (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/727,440

(22) Filed: Apr. 22, 2022

(65) Prior Publication Data
US 2023/0342006 A1 Oct. 26, 2023

(51) Int. Cl.
*G06F 3/0482* (2013.01)
*G06F 3/0484* (2022.01)
*B64D 43/00* (2006.01)

(52) U.S. Cl.
CPC ........... *G06F 3/0484* (2013.01); *B64D 43/00* (2013.01); *G06F 3/0482* (2013.01)

(58) Field of Classification Search
CPC .............................................. G06F 3/048–05
See application file for complete search history.

(56) References Cited

U.S. PATENT DOCUMENTS

| 5,454,074 A | * 9/1995 | Hartel ...................... B64G 1/22 701/14 |
| 5,522,026 A | * 5/1996 | Records ............... G05B 23/027 715/810 |
| 6,038,498 A | 3/2000 | Briffe et al. |

(Continued)

FOREIGN PATENT DOCUMENTS

| KR | 20100112873 A | * 10/2010 | ............. H04B 7/264 |
| WO | 2007086822 A2 | 8/2007 | |

OTHER PUBLICATIONS

English Translation of KR-20100112873-A published on Oct. 20, 2010, 10 pages (Year: 2010).*

(Continued)

*Primary Examiner* — Daniel Rodriguez
(74) *Attorney, Agent, or Firm* — Suiter Swantz pc llo

(57) ABSTRACT

An electronic checklist system is disclosed. The system configured to acquire an electronic checklist (ECL), the ECL including a plurality of tasks, each task including a command sequence including one or more command items. The system configured to display the plurality of tasks via a display and receive an initiation input via a user interface. The system configured to transmit one or more communications configured to initiate a performance of one or more automatable actions corresponding to the tasks, the one or more automatable actions configured to at least one of change or measure one or more system states. The system configured to receive system state data. The system configured to display, based on the system state data, one or more completion status graphics indicative of a completion of at least a portion of the plurality of tasks.

10 Claims, 5 Drawing Sheets

(56) References Cited

U.S. PATENT DOCUMENTS

| | | | | |
|---|---|---|---|---|
| 6,753,891 | B1* | 6/2004 | Chohan | G06Q 10/06316 701/538 |
| 7,114,154 | B1* | 9/2006 | Crohn | G06F 9/4843 715/810 |
| 7,289,890 | B2 | 10/2007 | Mitchell et al. | |
| 8,736,464 | B1* | 5/2014 | Downs Mullen | G01C 23/00 705/305 |
| 9,171,273 | B2 | 10/2015 | Thomas | |
| 10,705,684 | B2 | 7/2020 | Pandya et al. | |
| 10,766,632 | B2 | 9/2020 | Provost et al. | |
| 2003/0006910 | A1* | 1/2003 | Dame | G08G 5/0021 340/945 |
| 2003/0025682 | A1* | 2/2003 | Dame | G08G 5/0021 345/184 |
| 2007/0277120 | A1* | 11/2007 | Wilson | G06F 3/0482 715/810 |
| 2009/0037362 | A1* | 2/2009 | Fox | G06Q 10/10 707/999.102 |
| 2009/0108140 | A1* | 4/2009 | Adams | G06Q 10/06 340/945 |
| 2010/0174423 | A1 | 7/2010 | Pimouguet et al. | |
| 2012/0209468 | A1* | 8/2012 | Thomas | G07C 5/006 701/32.4 |
| 2014/0279809 | A1 | 9/2014 | Hershey et al. | |
| 2014/0281967 | A1* | 9/2014 | Bodnick | G06Q 10/06316 715/708 |
| 2018/0225616 | A1 | 8/2018 | Jones et al. | |
| 2018/0292953 | A1* | 10/2018 | Pandya | B64D 43/00 |
| 2019/0033888 | A1* | 1/2019 | Bosworth | B64C 13/16 |
| 2020/0047913 | A1 | 2/2020 | Shavit | |
| 2020/0122855 | A1* | 4/2020 | Conaway | B64D 43/00 |
| 2020/0253667 | A1* | 8/2020 | Fouts | G16H 30/40 |
| 2020/0298994 | A1* | 9/2020 | Conaway | G06F 16/9035 |
| 2022/0009651 | A1 | 1/2022 | Lampazzi et al. | |
| 2022/0119126 | A1* | 4/2022 | Anthony | G08G 5/0021 |

OTHER PUBLICATIONS

Extended European Search Report dated Sep. 5, 2023; European Application No. 23169603.0.

* cited by examiner

ELECTRONIC CHECKLIST COMMAND SEQUENCER

TECHNICAL FIELD

The present disclosure relates generally to autonomous control, and, more particularly, to autonomous control using electronic checklists.

BACKGROUND

Using an aircraft in an operational context requires various sets of tasks to be performed. Generally, the pilot may need to perform a set of tasks at certain times (e.g., before takeoff, during takeoff, etc.). The pilot, in a checklist fashion, generally performs each task individually, monitors the task for successful implementation, determines the next task to perform, and continues until all tasks are performed. This may require a large portion of the pilot's attention and many manual operations by the pilot performed in series.

As pilot operations move towards single pilot operations over dual-pilot operations, the demands required of the pilot may increase.

SUMMARY

An electronic checklist system is disclosed. In embodiments, the system is configured to acquire an electronic checklist (ECL), the ECL including a plurality of tasks, each task including a command sequence including one or more command items. The system is configured to display the plurality of tasks via a display and receive an initiation input via a user interface. The system is configured to transmit one or more communications configured to initiate a performance of one or more automatable actions corresponding to the tasks, the one or more automatable actions configured to at least one of change or measure one or more system states. The system is configured to receive system state data. The system is configured to display, based on the system state data, one or more completion status graphics indicative of a completion of at least a portion of the plurality of tasks.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
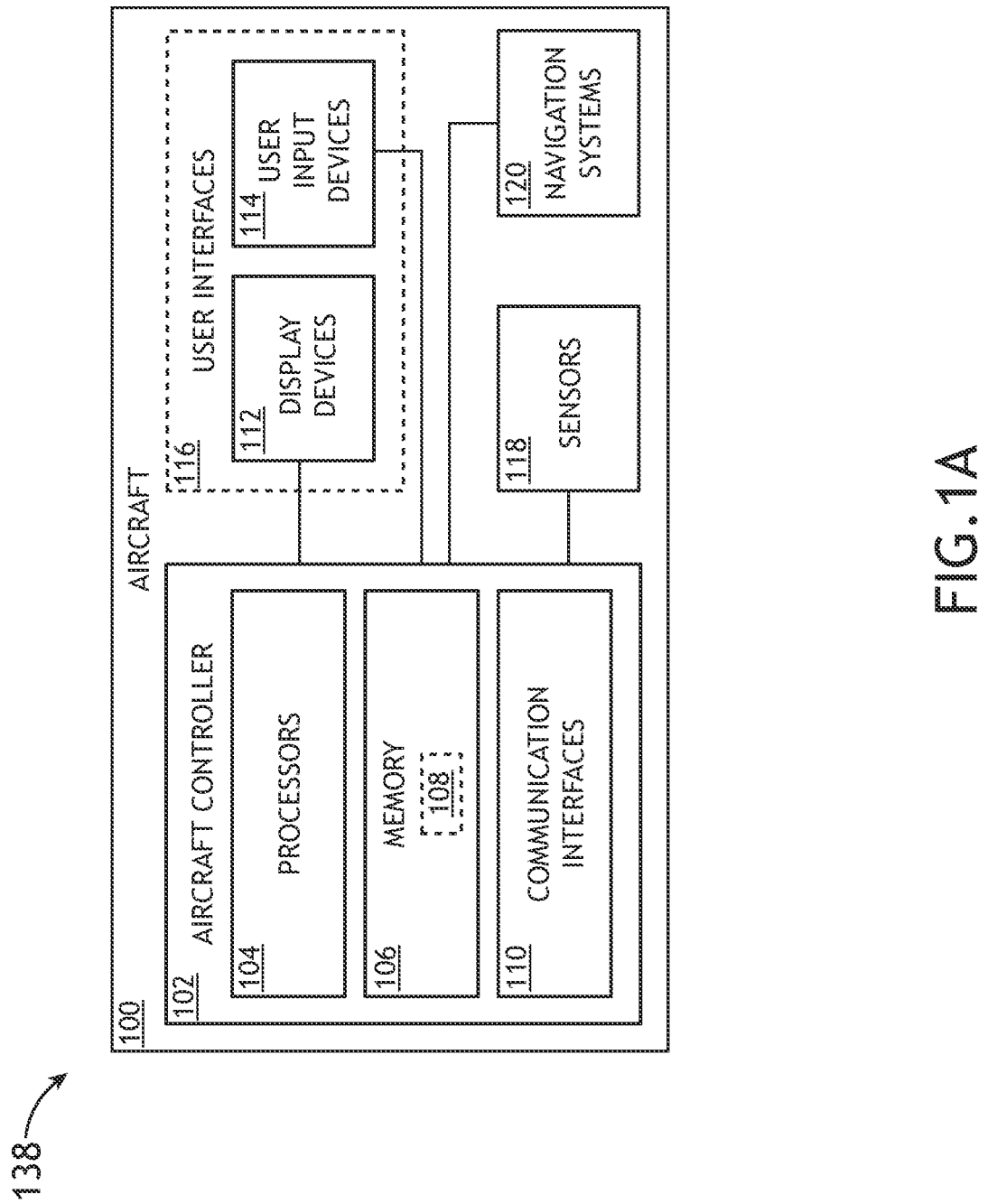
FIG. 1A illustrates a simplified block diagram of an aircraft including the electronic checklist system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIGS. 1A-3 generally illustrate a system and method for utilizing an electronic checklist.

Broadly speaking, at least some embodiments of the inventive concepts disclosed herein are directed to displaying a dynamically interactable electronic checklist providing for automated performance and monitoring of checklist elements (e.g., tasks and/or command items (e.g., subtasks)). The electronic checklist improves upon existing checklists (both paper-based and electronic-based) by grouping and automating actions (e.g., command items) that a user (e.g., pilot) would otherwise perform individually, freeing up valuable attention, but in a manner that still allows for user-monitoring of the tasks at a high level.

During non-normal or emergency situations a pilot may become extremely busy with system failure mitigation procedures. Preoccupation with low level concerns can erode the pilot's situational awareness. Perversely, complete automation of cockpit task, can further degrade the pilot's ability to quickly grasp complex developments. Automation may induce complacency, and it can also cause a change in an aircraft's configuration without the pilot's knowledge.

It is contemplated herein that it may be desirous to preserve meaningful, engaging tasks for the pilot while reducing the more tedious aspects of those tasks. This would allow a pilot to remain aware of the aircraft's state without becoming overburdened by small actions.

Figure 1B:
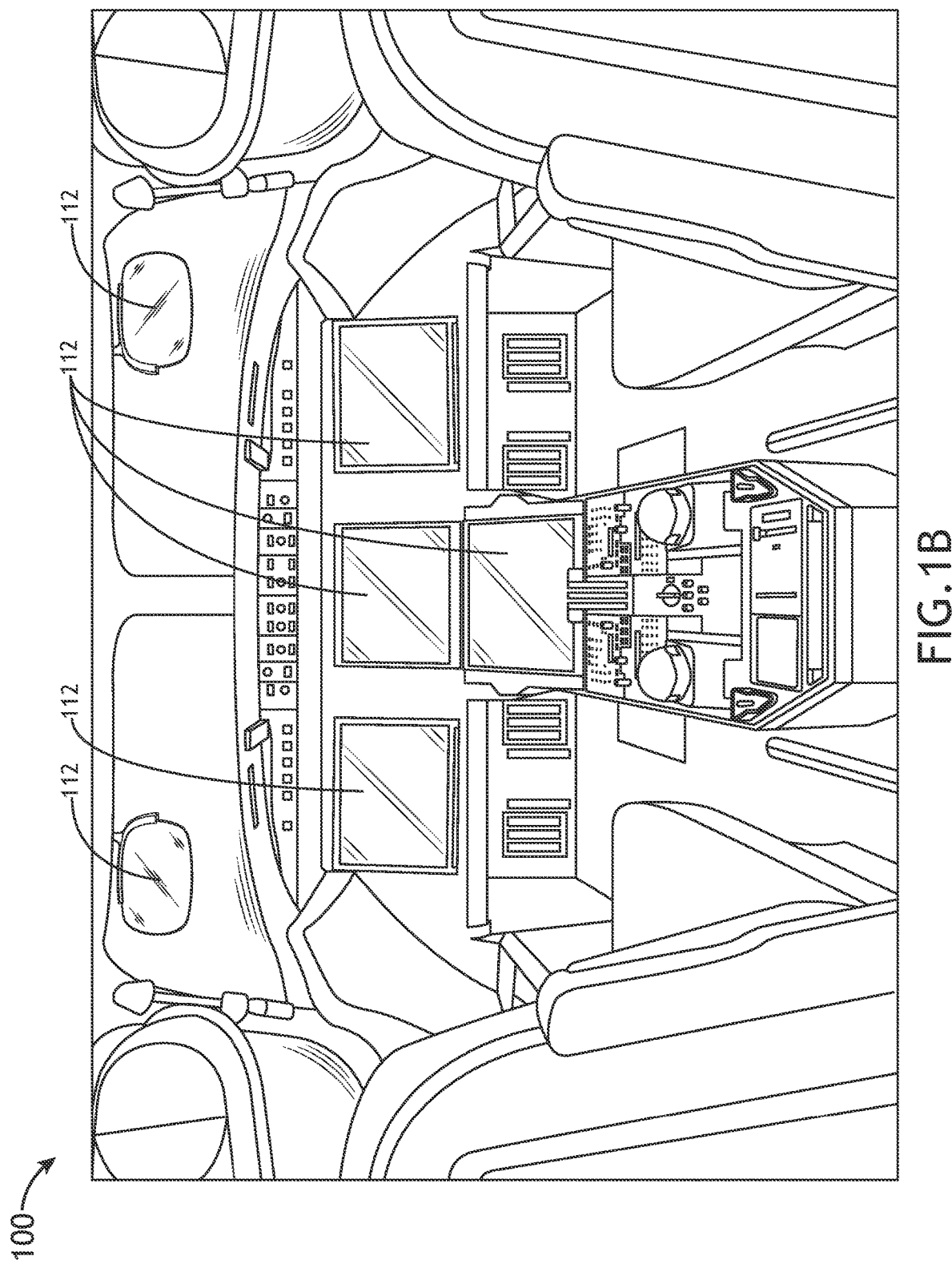
FIG. 1B illustrates an aircraft including the electronic checklist system, in accordance with one or more embodiments of the present disclosure.

FIGS. 1A-1B illustrate an aircraft including an electronic checklist system 100 (ECL system 100), in accordance with one or more embodiments of the present disclosure.

Referring now to FIG. 1A, the aircraft 100 may include an aircraft controller 102 (e.g., on-board/run-time controller). The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images and/or two-dimensional images. Referring now to FIG. 1B, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), one or more adaptive flight displays (AFDs) 112, one or more primary flight displays (PFDs) 112, or the like. The one or more display devices 112 may be employed to present flight data including, but not limited to, situational awareness data (e.g., chart data) and/or flight queue data to a pilot or other crew member. For example, the situational awareness data (e.g., chart data) may be based on, but is not limited to, aircraft performance parameters, aircraft performance parameter predictions, sensor readings, alerts, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124.

The one or more offboard controllers 124 may include one or more processors 126, memory 128 configured to store one or more programs instructions 130 and/or one or more communication interfaces 132.

The aircraft controller 102 and/or the one or more offboard controllers 124 may be coupled (e.g., physically, electrically, and/or communicatively) to one or more satellites 134. For example, the aircraft controller 102 and/or the one or more offboard controllers 124 may be coupled (e.g., physically, electrically, and/or communicatively) to one another via the one or more satellites 134. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 134 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, Boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 2A:
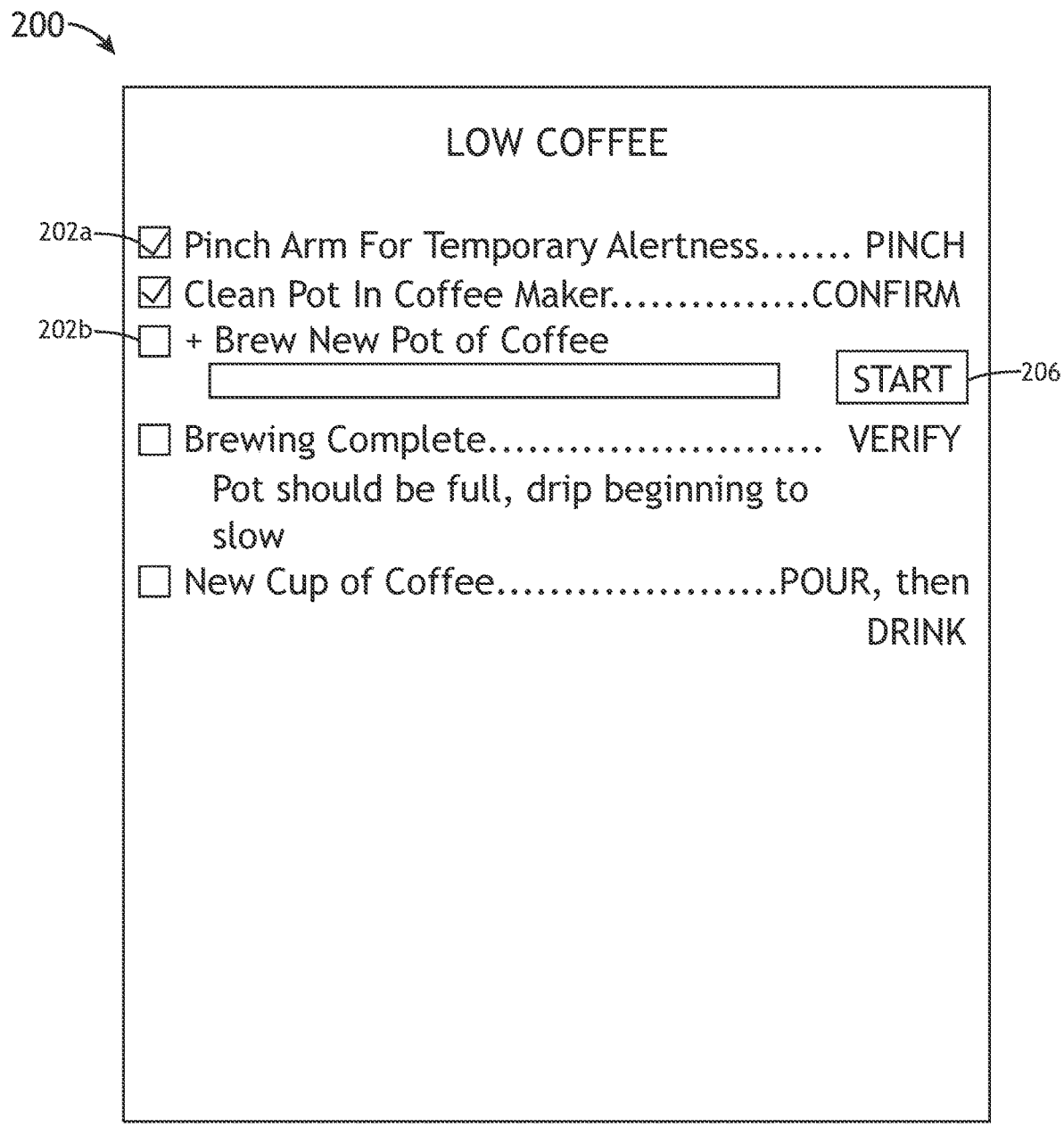
FIG. 2A illustrates a schematic of an electronic checklist system before an initiation input, in accordance with one or more embodiments of the present disclosure.
Figure 2B:
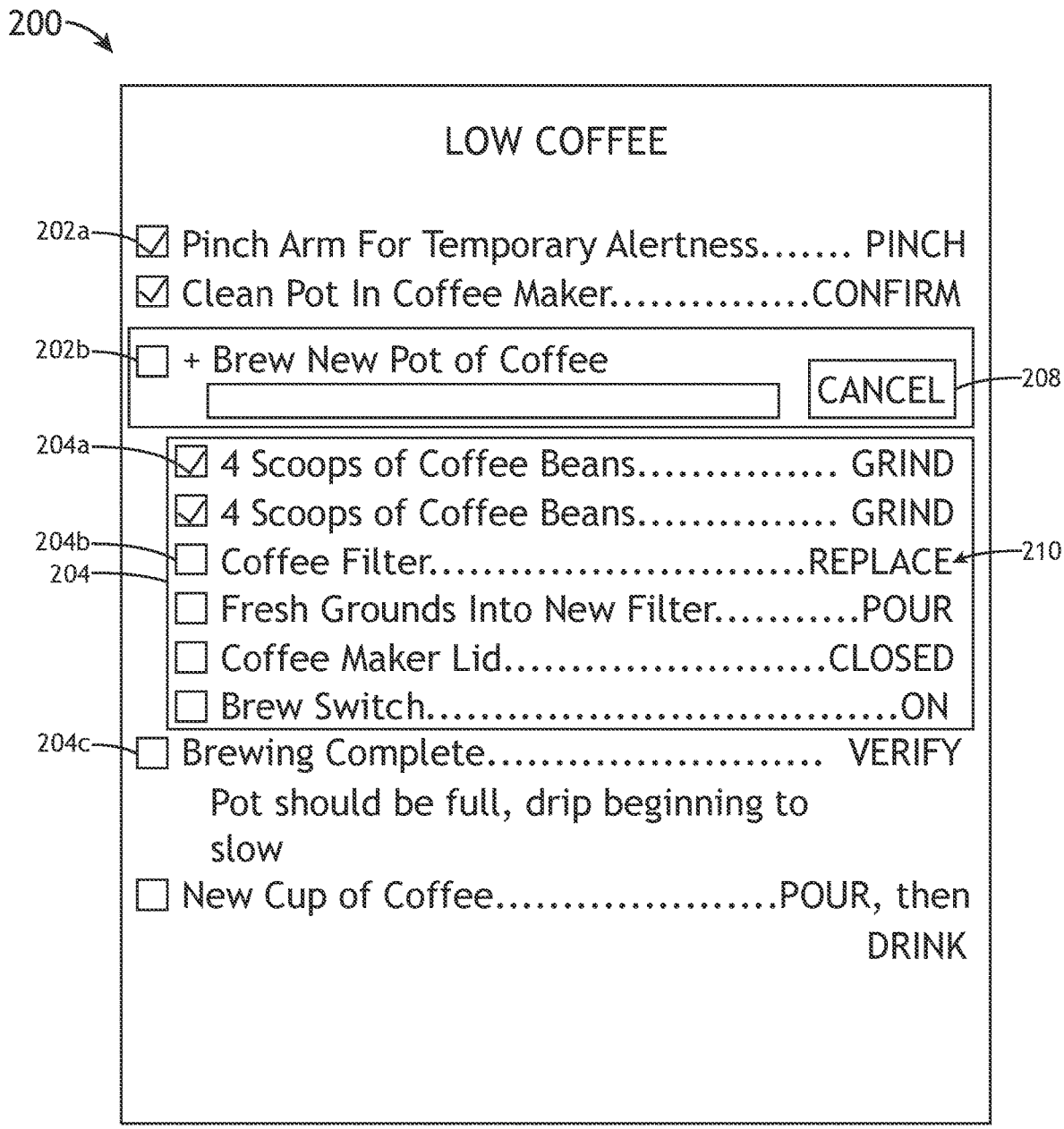
FIG. 2B illustrates a schematic of an electronic checklist system after an initiation input and with a task in an expanded state, in accordance with one or more embodiments of the present disclosure.

Referring now to FIGS. 2A-2B, a schematic of an electronic checklist (ECL) system 200 is disclosed. The ECL system 200 may correspond to an electronic checklist (ECL) and the ECL may be displayed as a graphical user interface (GUI) as shown. The ECL may be displayed via an ECL interface module 320. It should be noted that the term "module", program instructions, memory, and the like (e.g., ECL interface module 320, CCS module 322) in the present disclosure may mean any element configured to perform such actions (e.g., transmissions, and the like), such as, but not limited to, software code (e.g., heuristic software code) in the same application, software code in a separate application, on the same controller (e.g., controller 102), on a different controller, and the like and is not limited to the figures and descriptions herein.

In embodiments, the GUI may be displayed on any computing device including a display and/or a touchscreen (i.e., a touch-sensitive display surface capable of accepting directed control input provided by a user by making contact with a particular location relative to the display surface, e.g., by tapping, pressing for an extended length of time, or directing a finger or stylus along the surface of the screen in a predetermined path) and in communication with networks or controller devices/systems aboard the aircraft. For example, the GUI may be displayed on an interactive panel display 112 within an airplane cockpit.

In embodiments, the ECL system 200 (e.g., and the GUI as shown) may include a plurality of tasks 202 (e.g., task 202a, task 202b). In embodiments, the plurality of tasks 202 may each include one or more command items 204.

In embodiments, the GUI may incorporate controls allowing the user to perform one or more actions (such as initiate or cancel a task). For example, the ECL system 200 may include an initiation input graphic 206 (e.g., a START button) allowing a user to start a sequence of automated command items 204 of a task 202. For example, a user selecting the initiation input graphic 206 may cause an initiation input to be received (e.g., by the ECL system 200). Further, one or more communications may be transmitted based on the initiation input (e.g., via a different module (e.g., CCS module), including being "indirectly" based on the initiation input, whereby the different module (e.g., CCS module) may independently obtain a user input (e.g., via a confirmation input) based on a notification of the initiation input, and may transmit the one or more communications based on the confirmation input; in this regard, the one or more communications may, in a sense, also be indirectly based on the initiation input (not just the confirmation input) due to the initiation input triggering the start of such events).

For example, the transmission of the one or more communications may be a sequence of transmissions (e.g., and may be performed by a command control sequencer (CCS) module 322). The one or more communications may be configured to initiate a performance of one or more automatable actions corresponding to the various command items 204 (e.g., tasks 202). For example, an automatable action may include changing the position of the landing gear by activating an actuator, sensing/verifying that certain aircraft/environment parameters are within tolerance of acceptable limits, and the like). The one or more communications may be configured to change and/or measure one or more system states. For example, using sensors of communications, receive system state data corresponding to states of various systems/sub-systems of an aircraft (e.g., landing gear position, trim position, fuel level, valve positions, electrical connections, pump states, and the like).

For example, the transmission may be performed based on pre-defined logic or timers. For instance, a second command item 204 may not be performed until a first command item 204 is performed and a certain amount of time has passed. The previous instance is but one example, and any number of logic and/or timers may be used to determine when and how to perform an automatable action corresponding to the one or more command items 204.

In embodiments, the ECL system 200 may be configured to display, based on the system state data, one or more completion status graphics (e.g., checked boxes) indicative of a completion of at least a portion of the plurality of tasks of the ECL. For example, the ECL system 200 displays a completion status graphic (e.g., checked box) for completed tasks/command items and an un-initiated status graphic (e.g., unchecked box) for uncompleted and/or un-initiated tasks as shown for completed task 202a and un-initiated task 202b.

Figure 3:
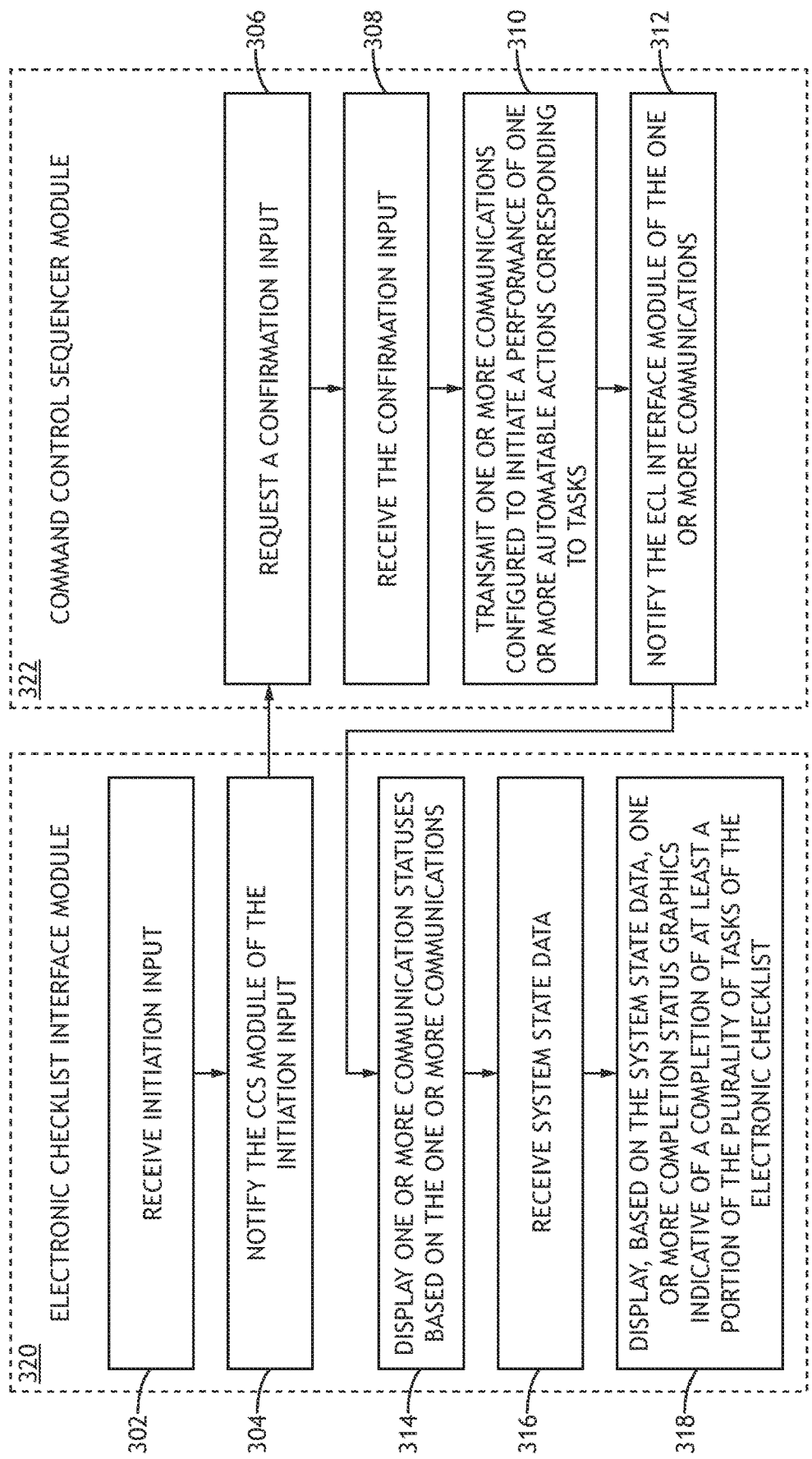
FIG. 3 illustrates a flow diagram depicting a method or process for using an electronic checklist system, in accordance with one or more embodiments of the present disclosure.

Referring now to FIG. 3, a flow diagram depicting a method or process for using an electronic checklist system is disclosed, in accordance with one or more embodiments of the present disclosure. The present method may be a method of using the systems (e.g., electronic checklist system 200) described with respect to FIGS. 1A-2B.

It should be noted that the ECL system 200 may be implemented using one or more modules configured to perform various steps/actions. The one or more modules may increase safety and redundancy such that if any one module experiences an error and/or failure, the other module may redundantly perform the same or a similar step such that the ECL system 200 may be therefore more robust, safe, and reliable in communicating information to a user and in performing various steps/actions.

In embodiments, the ECL system 200 is implemented using an ECL interface module 320 and/or a command control sequencer (CCS) module 322. In embodiments, steps may optionally be performed, but are not required to be performed, by the module that the step is located within in FIG. 3.

In embodiments the ECL interface module 320 may conceptually provide for an interface between a user and the ECL system 200 and the CCS module 322 may conceptually provide for a control and sequencing of the command items 204 to be performed. It should be noted that the ECL interface module 320 and the CCS module 322 may be implemented in the same program on the same controller, in separate programs on the same controller, on separate controllers (e.g., communicating wired and/or wirelessly), or any other configuration.

At 302, initiation input is received (e.g., via the ECL interface module 320, as shown in FIG. 3).

At 304, the CCS module 322 is notified of the initiation input (e.g., the initiation input or an indication thereof is received by the CCS module 322) (e.g., via the ECL interface module 320).

At 306, a confirmation input is requested (e.g., via the CCS module 322). For example, the GUI may display a pop-up window, or any other graphic, requesting a confirmation (e.g., yes/no) that the user wishes to proceed with initiation of a task. As shown, this step may be performed via the CCS module 322 such that the CCS module 322 independently receives (obtains) input from a user (e.g., an indication corresponding to a user's desire to initiate a task and the like), adding an extra layer of safety and redundancy to the ECL system 200. In this way, an error, miscommunication, or malfunction of the ECL interface module 320 would not cause an improper initiation of a task 202.

At 308, the confirmation input is received (e.g., the user confirms) (e.g., via the CCS module 322).

At 310, one or more communications configured to initiate a performance of one or more automatable actions corresponding to tasks 202 of the electronic checklist are transmitted (e.g., via the CCS module 322). For example, a controller may be configured to transmit a signal that causes an actuation of landing gear to a different position (e.g., an automatable action) to be performed.

At 312, the ECL interface module may be notified of the one or more communications (e.g., receive a signal that is the one or more communications or an indicative of a transmission of the one or more communications) (e.g., via the CCS module 322). In this way, the ECL interface module 320 may be aware of the progress of initiated tasks/command items and may be configured to display/communicate this information to the user (e.g., in real-time, continuously updating).

At 314, one or more communication statuses (e.g., changing a font color of a task to indicate the task is being sequentially performed, a partially filled status bar, and any other graphic) may be displayed based on the one or more communications (e.g., via the ECL interface module 320).

At 316, system state data (e.g., position of landing gear) may be received (e.g., via the ECL interface module 320 and/or the CCS module 322). For example, the ECL interface module 320 may receive system state data independently to increase the reliability of the information and the robustness of the ECL system 200 as a whole.

At 318, one or more completion status graphics (e.g., checked box, green font color) indicative of a completion of at least a portion of the plurality of tasks of the ECL may be displayed (e.g., on the display 112, on the GUI), based on the system state data (e.g., via the ECL interface module 320). For example, retracting the landing gear may be an automatable action, and after it is performed based on a communication, a sensor may sense the position of the landing gear, generating landing gear sensor data. The landing gear sensor data may be used by the ECL interface module to determine that a command item 204 is completed.

At an (optional) step not shown, (e.g., via the ECL interface module 320), one or more failure status graphics 210 (e.g., as shown in FIG. 2) may be displayed (via the display) in an event corresponding to one or more automatable action failures of the performance of the one or more automatable actions. For instance, where each failure status graphic 210 (e.g., font color change (e.g., to yellow), inversed colors of font and font background, a phrase, a symbol, and the like) corresponds to a failed task and is indicative of a failure of at least one command item of the failed task (e.g., the worst-case failure of the command items 204 within the task 202). For example, in an expanded state, a failure status graphic 210 (e.g., phrase "REPLACE") may be configured to be generated proximate to a heading of command item 204. In another example, a failure status graphic 210 may be configured to be generated proximate to a heading of a task 202 (e.g. font color change, inversed colors of font and font background, and the like). In this regard, any failure of any command item 204 may be seen by a user at a high level (e.g., at the task level) such that the user maintains situational awareness of command items 204 even when a task 202 is in the collapsed state. For instance, such a failure status graphic 210 may indicate the presence of a failure of a command item 204 to be performed successfully or an action required or requested (e.g., by the user) that is needed to be performed before proceeding. Referring to automatable action failures generally in regards to the illustrative non-limiting example shown in FIG. 2B, a failure status graphic could be a "REPLACE" phrase in a coffee brewing example. Note that the example of brewing coffee throughout this disclosure is used for illustrative purposes only, is not meant to be limiting and the tasks and command items may be any task and command item, such as may be required by a user (e.g., but not limited to landing checklists, takeoff checklists, pre-flight checklists, and any other checklist items).

At an (optional) step not shown, (e.g., via the ECL interface module 320), one or more command items of a particular task are configured to be displayed (via the display) when the particular task is in an expanded state and not to be displayed when in a collapsed state. For example, activation/selection of a task heading (e.g., "Brew New Pot of Coffee") or any other expansion graphic (e.g., "plus" symbol) may cause the command items 204 of that task 202 to be displayed (e.g., displayed below the task heading). In this regard, for example, in the event of a failure of a command item 204, the user may have the ability to observe which command item 204 in more detail.

At an (optional) step not shown, (e.g., via the ECL interface module 320), a cancellation graphic 208 (e.g., as shown in FIG. 2B) may be displayed and may be configured to, upon activation/selection, cause the transmitting of the one or more communications to be cancelled such that no further communications are transmitted (e.g., thereby limiting the automatable actions performed).

The present system and method significantly improve situational awareness, reduce manual labor, and may be especially advantageous in situations where a pilot needs as much attention available as possible (e.g., in an emergency, when a single pilot is performing operations typically performed by two pilots).

The inventive concepts disclosed herein are described above with reference to drawings. These drawings illustrate certain details of specific embodiments that implement the systems and methods and programs of the present disclosure. However, describing the inventive concepts with drawings should not be construed as imposing on the inventive concepts disclosed herein any limitations that may be present in the drawings. Embodiments of the inventive concepts disclosed herein contemplate methods, systems and program products on any machine-readable media for accomplishing its operations. Embodiments of the inventive concepts disclosed herein may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments of the inventive concepts disclosed herein include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general-purpose computer, special purpose computer, or special purpose processing machine to perform a certain module or group of modules. Machine or computer-readable storage media, as referenced herein, do not include transitory media (i.e., signals in space).

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An electronic checklist system, the system comprising:
a display;
a user interface of the display;
one or more controllers including one or more processors configured to execute a set of program instructions stored in a memory, the set of program instructions configured to cause the one or more processors to:
acquire an electronic checklist (ECL), the ECL comprising a plurality of tasks, each task of the plurality of tasks comprising a command sequence including one or more command items;
display the plurality of tasks via the display and via an ECL interface module, the displaying comprising displaying the plurality of tasks of the ECL within a graphical user interface (GUI) of the display, wherein the ECL interface module is configured to not display the one or more command items of a particular task when the particular task is in a collapsed state and to display the one or more command items of the particular task when the particular task is in an expanded state;
receive, via the ECL interface module, an initiation input via the user interface;
request, via a command control sequencer (CCS) module, a confirmation input, based on the initiation input such that the ECL interface module and the CCS module are each configured to independently obtain input corresponding to a user's desire to initiate one or more automatable actions corresponding to the plurality of tasks; and
receive, via the CCS module, the confirmation input;
transmit, via the CCS module, one or more communications configured to initiate a performance of the one or more automatable actions corresponding to the plurality of tasks, the one or more automatable actions configured to at least one of change or measure one or more system states, each automatable action of the one or more automatable actions corresponding to a command item;
receive, via the ECL interface module, system state data;
display, via the display and via the ECL interface module, based on the system state data, one or more completion status graphics indicative of a completion of at least a portion of the plurality of tasks of the ECL.

2. The system of claim 1,
wherein the transmitting the one or more communications is configured to be performed as a sequence and the CCS module is configured to perform the transmitting based on at least one of: pre-defined logic or timers.

3. The system of claim 2, the set of program instructions further configured to cause the one or more processors to:
display, via the display, one or more communication statuses, based on the transmitting the one or more communications.

4. The system of claim 2, the set of program instructions further configured to cause the one or more processors to:
display, via the display and in an event corresponding to one or more automatable action failures of the performance of the one or more automatable actions, one or more failure status graphics,
wherein each failure status graphic corresponds to a failed task and is indicative of a failure of at least one command item of the failed task.

5. The system of claim 1, the set of program instructions further configured to cause the one or more processors to:
display, via the user interface, a cancellation graphic configured to, upon activation, cause the transmitting of the one or more communications to be cancelled such that no further communications are transmitted.

6. An electronic checklist system, the system comprising:
one or more controllers including one or more processors configured to execute a set of program instructions stored in a memory, the set of program instructions configured to cause the one or more processors to:
acquire an electronic checklist (ECL), the ECL comprising a plurality of tasks, each task of the plurality of tasks comprising one or more command items;
display, via a display and via an ECL interface module, the plurality of tasks of the ECL within a graphical user interface (GUI), wherein the ECL interface module is configured to not display the one or more command items of a particular task when the particular task is in a collapsed state and to display the one or more command items of the particular task when the particular task is in an expanded state;
receive, via the ECL interface module, an initiation input;
request a confirmation input, via a command control sequencer (CCS) module, based on the initiation input such that the ECL interface module and the CCS module are each configured to independently obtain input corresponding to a user's desire to initiate one or more automatable actions corresponding to the plurality of tasks;
receive the confirmation input via the CCS module;
transmit, via the CCS module, one or more communications configured to initiate a performance of the one or more automatable actions corresponding to the plurality of tasks, the one or more automatable actions configured to at least one of change or measure one or more system states,
receive, via the ECL interface module, system state data;
display, via the display and via the ECL interface module, based on the system state data, one or more completion status graphics indicative of a completion of at least a portion of the plurality tasks of the ECL.

7. A method for using electronic checklists, the method comprising:
acquiring an electronic checklist (ECL), the ECL comprising a plurality of tasks, each task of the plurality of tasks comprising one or more command items;
displaying via a display and via an ECL interface module the plurality of tasks of the ECL within a graphical user interface (GUI), wherein the ECL interface module is configured to not display the one or more command items of a particular task when the particular task is in a collapsed state and to display the one or more command items of the particular task when the particular task is in an expanded state;
receiving, via the ECL interface module, an initiation input;
requesting, via the CCS module, a confirmation input, based on the initiation input such that the ECL interface module and the CCS module are each configured to independently obtain input corresponding to a user's desire to initiate one or more automatable actions corresponding to the plurality of tasks; and
receiving, via the CCS module, the confirmation input;
transmitting, via a command control sequencer (CCS) module, one or more communications configured to initiate a performance of one or more automatable actions corresponding to the tasks, the one or more automatable actions configured to at least one of change or measure one or more system states, each automatable action of the one or more automatable actions corresponding to a command item;
performing, automatically, the one or more automatable actions corresponding to the tasks;
receiving, via the ECL interface module, system state data;
displaying, via the display and via the ECL interface module, based on the system state data, one or more completion status graphics indicative of a completion of at least a portion of the plurality of tasks of the ECL.

8. The method of claim 7,
wherein the transmitting the one or more communications is configured to be performed as a sequence and the CCS module is configured to perform the transmitting based on at least one of: pre-defined logic or timers.

9. The method of claim 8, the method further comprising displaying, via the display, one or more communication statuses, based on the transmitting the one or more communications.

10. The method of claim 7, the method further comprising displaying, via the user interface, a cancellation graphic configured to, upon activation, cause the transmitting of the one or more communications to be cancelled such that no further communications are transmitted.

* * * * *